(12) United States Patent
Blackwelder et al.

(10) Patent No.: US 7,497,140 B2
(45) Date of Patent: Mar. 3, 2009

(54) HEAVY DUTY FIELD MAST

(75) Inventors: Paul Bradford Blackwelder, Wadsworth, OH (US); Michael J. Kardohely, West Salem, OH (US)

(73) Assignee: The Will-Burt Company, Orville, OH (US)

( * ) Notice: Subject to any disclaimer, the term of this patent is extended or adjusted under 35 U.S.C. 154(b) by 577 days.

(21) Appl. No.: 11/123,705

(22) Filed: May 4, 2005

(65) Prior Publication Data
US 2006/0213295 A1 Sep. 28, 2006

Related U.S. Application Data

(60) Provisional application No. 60/660,955, filed on Mar. 11, 2005.

(51) Int. Cl.
*F16H 1/20* (2006.01)
(52) U.S. Cl. .................... 74/89.28; 74/89.39; 74/89.45; 52/118
(58) Field of Classification Search ................ 74/89.35, 74/89.38, 89.39, 89.45, 411.5, 89.28; 70/181–189, 70/210, 216; 192/215; 188/265, 300
See application file for complete search history.

(56) References Cited

U.S. PATENT DOCUMENTS

| | | | | | |
|---|---|---|---|---|---|
| 1,862,759 | A | * | 6/1932 | Morrison | 254/102 |
| 2,409,288 | A | * | 10/1946 | Leland | 74/89.4 |
| 2,713,810 | A | * | 7/1955 | Hill | 74/89.35 |
| 2,787,353 | A | * | 4/1957 | Spraragen | 192/223.2 |
| 3,404,580 | A | * | 10/1968 | Valenti | 74/89.35 |
| 3,436,973 | A | * | 4/1969 | Aweimrine | 74/89.39 |
| 3,576,135 | A | * | 4/1971 | Tschunko | 74/89.27 |
| 3,592,070 | A | * | 7/1971 | Hammond | 74/89.35 |
| 4,049,097 | A | * | 9/1977 | Pratt | 192/223.2 |
| 4,062,156 | A | | 12/1977 | Roth | |
| 4,077,503 | A | * | 3/1978 | Lieberman et al. | 192/18 R |
| 4,189,950 | A | * | 2/1980 | Killian | 74/89.38 |
| 4,280,341 | A | * | 7/1981 | Krude | 464/167 |
| 4,295,390 | A | * | 10/1981 | Buchta | 74/625 |
| 4,420,917 | A | | 12/1983 | Parlanti | |
| 4,521,707 | A | * | 6/1985 | Baker | 310/80 |
| 4,651,581 | A | * | 3/1987 | Svensson | 74/89.35 |

(Continued)

OTHER PUBLICATIONS

International Search Report for International Application No. PCT/US05/15500.

*Primary Examiner*—Richard W L Ridley
*Assistant Examiner*—Phillip Johnson
(74) *Attorney, Agent, or Firm*—Fay Sharpe LLP (57) ABSTRACT

A telescoping mast has a plurality of elongate tubular sections which are telescopically attached to each other and an axial drive screw centrally located in the mast for extending and retracting the elongate tubular section. A gear assembly is connected to the drive screw for rotating the drive screw. A nut carrier assembly is secured to tubular sections. Each nut carrier assembly has a threaded nut housed within a nut carrier. The threaded nut engages corresponding threads on the drive screw. A locking mechanism is provided for locking the gear assembly which has a first section surrounding a second section secured to the gear assembly. The second section has an elongated member extending from a surface of the second section. The first section has at least one slot for engaging the elongated member, thereby preventing rotation of the gear assembly.

31 Claims, 9 Drawing Sheets

U.S. PATENT DOCUMENTS

| | | | |
|---|---|---|---|
| 4,697,672 A * | 10/1987 | Linton | 188/134 |
| 4,793,197 A * | 12/1988 | Petrovsky | 74/89.35 |
| 4,843,402 A | 6/1989 | Clement | |
| 4,871,138 A | 10/1989 | Sauter | |
| 5,102,375 A | 4/1992 | Featherstone | |
| 5,107,672 A | 4/1992 | Featherstone | |
| 5,111,709 A * | 5/1992 | Torii et al. | 74/89.35 |
| 5,139,464 A | 8/1992 | Lehnert | |
| 5,163,650 A * | 11/1992 | Adams et al. | 248/405 |
| 5,168,679 A * | 12/1992 | Featherstone | 52/118 |
| 5,203,746 A | 4/1993 | Lehnert | |
| 5,313,852 A * | 5/1994 | Arena | 74/89.35 |
| 5,360,185 A * | 11/1994 | Derrien | 244/102 R |
| 5,467,661 A * | 11/1995 | Lange | 74/441 |
| 5,572,837 A | 11/1996 | Featherstone et al. | |
| 5,593,129 A | 1/1997 | Adams et al. | |
| 5,615,855 A | 4/1997 | Marue et al. | |
| 5,718,087 A | 2/1998 | Featherstone et al. | |
| 5,743,635 A | 4/1998 | Hulse et al. | |
| 5,848,554 A * | 12/1998 | Kober et al. | 74/89.35 |
| 5,937,699 A * | 8/1999 | Garrec | 74/89.35 |
| 5,980,070 A | 11/1999 | Hulse et al. | |
| 6,026,970 A * | 2/2000 | Sturm et al. | 212/348 |
| 6,067,868 A * | 5/2000 | Nakamura et al. | 74/89.35 |
| 6,290,377 B1 | 9/2001 | Hulse | |
| 6,299,336 B1 | 10/2001 | Hulse | |
| RE37,559 E | 2/2002 | Marue et al. | |
| 6,435,048 B1 * | 8/2002 | Zimmerman | 74/89.35 |
| 6,546,677 B1 | 4/2003 | Featherstone | |
| 6,582,105 B1 | 6/2003 | Christensen | |
| 6,722,381 B2 * | 4/2004 | Lai | 135/20.3 |
| 6,767,115 B2 | 7/2004 | Blackwelder | |
| 6,880,416 B2 * | 4/2005 | Koch | 74/89.35 |
| 6,886,678 B2 * | 5/2005 | Acosta | 192/223.3 |
| 7,066,041 B2 * | 6/2006 | Nielsen | 74/89.35 |
| 7,185,868 B2 * | 3/2007 | Wang | 248/422 |
| 2002/0027176 A1 | 3/2002 | Ikuta | 242/247 |
| 2002/0104395 A1 * | 8/2002 | Zimmerman | 74/89.35 |
| 2002/0162410 A1 * | 11/2002 | Zimmerman | 74/89.35 |
| 2003/0183027 A1 * | 10/2003 | Koch | 74/89.35 |
| 2004/0173041 A1 * | 9/2004 | Said | 74/89.35 |
| 2005/0050976 A1 * | 3/2005 | Ko et al. | 74/425 |
| 2005/0103137 A1 * | 5/2005 | Chang et al. | 74/89.26 |

\* cited by examiner

HEAVY DUTY FIELD MAST

CROSS-REFERENCE TO RELATED APPLICATION

This application claims the benefit of U.S. Provisional Application Ser. No. 60/660,955 filed Mar. 11, 2005.

BACKGROUND OF THE INVENTION

The present invention relates to the art of telescoping masts and more particularly to a telescoping mast having a rigid drive assembly for telescoping mast sections to any position between fully retracted and fully extended heights.

Quick erecting telescoping masts are used for many applications including civilian, industrial and military applications throughout the world. Quick erecting telescoping masts are particularly suited for applications wherever there is a need for portable masts requiring fast setup and teardowns with minimum power and effort. In addition to numerous military applications, including target acquisition, surveillance and field communications, quick erecting telescoping masts are utilized commercially to support a wide variety of antennas, elevated testing equipment, floodlights and cameras. Free-standing masts can be installed on a wide variety of vehicles and shelters.

Heretofore, telescoping masts have been either pneumatically, hydraulically or chain driven. Pneumatic masts require airtight seals between telescopic mast sections in order to function as intended. However, the environment in which such masts are used makes maintaining an airtight condition between mast sections problematic. Contaminants, or radial ice, deposited between mast sections, or at the junctions will stop the mast from descending or cause damage to the mast sections, and can easily destroy the seal required for efficient operation of the pneumatic mast. In the event that the pneumatic integrity of the seal is destroyed, the mast will come down due to gravity with potentially disastrous consequences.

A further disadvantage to pneumatically powered telescoping masts is that they can only assume one of two positions. Either the masts are fully extended or fully retracted. In many applications, however, because of obstructions or other considerations, it is desirable to have the telescoping mast sections in a partial state of extension or retraction. A further disadvantage with pneumatic masts is that they are relatively heavy in weight, limiting their suitability for vehicle roof applications.

Hydraulic systems for elevating masts suffer from many of the same shortcomings. Hydraulic drives are relatively heavy in weight and are expensive to manufacture, assemble, and maintain. Moreover, such drives are vulnerable to damage from contact with the environment since hydraulic lines are exposed. Additionally, contaminants can infiltrate the hydraulic system and cause malfunction or failure.

Chain driven telescopic masts likewise suffer from the same deficiencies. The drive mechanisms are relatively heavy in weight and are expensive to manufacture, assemble and maintain. The chain link mechanism is also exposed and susceptible to damage from contact with environmental objects.

Telescoping masts have been widely employed for radio antennas, lights and a variety of other fixtures. Such masts have been operated by a variety of mechanisms, including winches, hydraulic systems and the like. More recently, telescoping masts have been devised which use an axial screw mechanism for raising and lowering the mast sections.

When telescoping masts are used under extreme environmental conditions and particularly in military or other portable operations, it is highly desirable that the masts be ruggedly constructed and be extremely fast, reliable and safe to operate. In such portable masts, it is particularly important that the sections be extended and retracted in sequence and that as each section is fully extended it is positively locked to the next lower section. In these ways the mast can be extended to the full desired height and the possibility of accidents and injuries due to one or more of the mast sections suddenly coming down is minimized.

Another complication is encountered when an axial drive screw system is used for raising and retracting a telescoping antenna. The nut-elements carried by each mast section must sequentially engage and disengage the threads of the drive screw as the respective mast sections are raised. Since there will normally be some initial mismatch between the threads of the drive screw and the threads of the nut, axial loadings will temporarily be applied to the drive mechanism until the nuts properly engage the threads of the drive screw. Such axial loadings can damage the drive train components.

Accordingly, there is a need for a mast telescopic system with a locking mechanism which overcomes the above-mentioned defects and others while providing more advantageous overall results.

SUMMARY OF THE INVENTION

The present invention is specifically directed to a telescoping mast assembly incorporating a plurality of interconnected mast sections nesting within each other and adopted for movement between a fully retracted height and a fully extended height. A rigid drive assembly telescopes the mast sections to any position between the fully retracted and the fully extended height.

In accordance with one aspect of the present invention, a telescoping mast has at least three elongate tubular sections, wherein a first, a second, and a third elongate tubular section each has an upper end and a lower end. The second elongate tubular section is telescopically received by the first elongate tubular section. The third elongate tubular section is telescopically received by the second elongate tubular section. An axial drive screw is centrally located in the mast assembly for extending and retracting the second and third elongate tubular sections. A nut carrier assembly is secured to a bottom section of each of the second and third tubular sections. The nut carrier assemblies each comprises a threaded nut housed within a bottom structure or "nut carrier". The threaded nut engages corresponding threads on the drive screw.

In accordance with another aspect of the present invention, a telescoping mast has a plurality of elongate tubular sections which are telescopically attached to each other; an axial drive screw centrally located in the mast for extending and retracting the elongate tubular sections; and a gear assembly is connected to the drive screw for rotating the drive screw. A locking mechanism locks the gear assembly and has a first section surrounding a second section secured to the gear assembly. The second section has at least one elongated member extending from a surface of the second section. The first section has at least one slot for engaging the at least one elongated member, thereby preventing rotation of the gear assembly.

A primary object of the invention is to provide a positive mechanism to lock the mast sections in positions ranging from fully retracted to fully extended.

A further object of the present invention is to provide a telescoping mast assembly which provides accurate positioning of the mast.

A still further object of the present invention is to provide a telescoping mast assembly which is relatively rugged while being relatively easy to maintain.

Yet another object of the present invention is to provide a telescoping mast assembly which obviates the problems and limitations of the prior art devices.

These and other objects and advantages will become apparent from the following description taken together with the accompanying drawings.

BRIEF DESCRIPTION OF THE DRAWINGS

The invention may take form in certain components, structures, and steps, the preferred embodiments of which will be illustrated in the accompanying drawings.

DETAILED DESCRIPTION OF THE PREFERRED EMBODIMENTS

Figure 1:
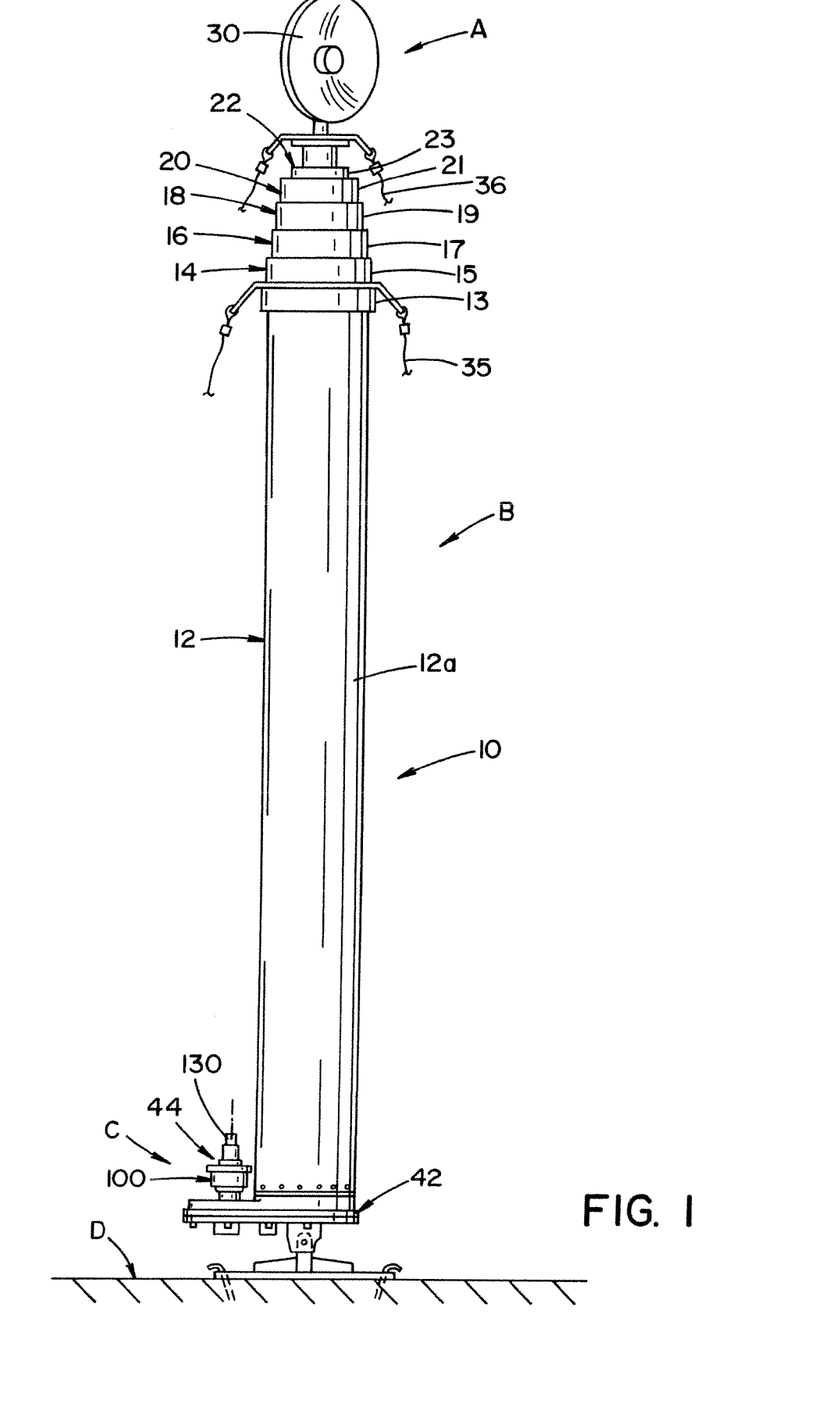
FIG. 1 is a side elevational view of a telescoping mast assembly in a fully retracted position in accordance with a preferred embodiment of the present invention.
Figure 2:
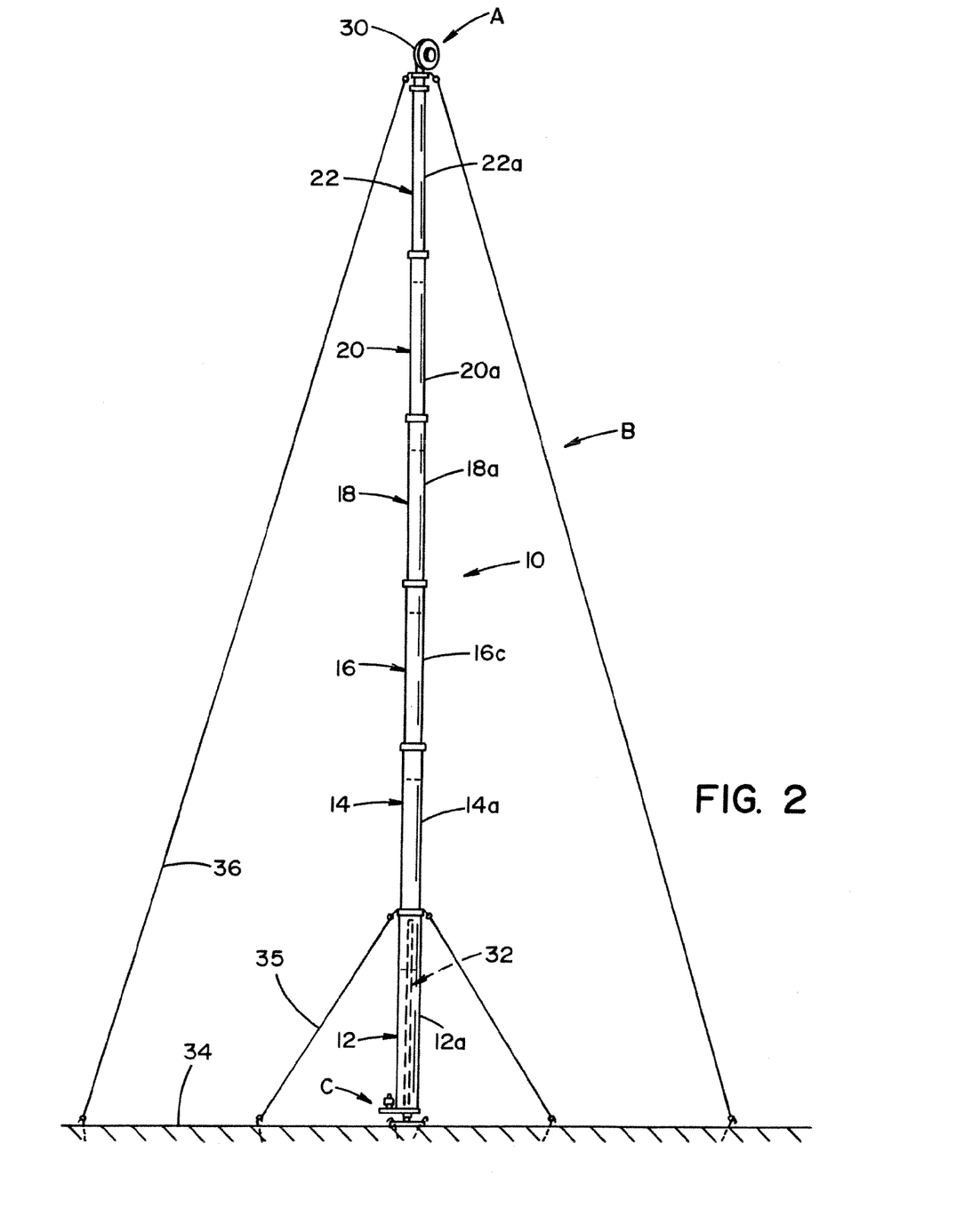
FIG. 2 is a side-elevational view of the telescoping mast of FIG. 1 in a fully extended position.

Referring now to the drawings wherein the showings are for the purpose of illustrating preferred embodiments of the invention only, and not for the purpose of limiting same, FIG. 1 shows an antenna A used with a mast assembly B and an associated gear drive unit C. A telescoping mast assembly 10 is used with a vehicle D, such as a truck. The telescoping mast assembly 10 includes a plurality of interconnected mast sections 12, 14, 16, 18, 20, and 22 as shown in FIG. 1. Although six interconnected mast sections are illustrated, it is within the scope of the present invention to incorporate any number as desired. Typically, the mast extends in a range from about 20 feet to about 150 feet. However, it is within the terms of the invention to lengthen or shorten the range as required. As illustrated in FIGS. 1 and 2, the outermost mast section 12 is stationary and is immovably affixed to a movable support structure such as a vehicle or ground surface D. The innermost mast section 22 is attached to any desired operating equipment 30, such as an antenna, which is supported by the mast assembly 10.

As further illustrated in FIG. 1, each of the interconnected mast sections are cylindrical tubes having outwardly extending cylindrical collars 13, 15, 17, 19, 21 and 23 which have a slighter larger diameter than the external diameter of the tubes, 12-22, respectively, in a longitudinal direction. The cylindrical collars can provide a bearing surface between the cylindrical tubes.

Typically, the individual mast sections are manufactured from high strength, heat treated anodized aluminum alloy tubes and collars. It is also within the terms of the present invention to form the tubes of other materials such as carbon fiber sheets which are advantageous because of their light weight relative to their high strength. Moreover, these materials can easily be shaped into cross-sections, other than circular, as desired.

Each of the mast sections 12-22 includes a corresponding mast tube designated, sequentially, 12a-22a, and each of the tubes has an upper end and a lower end with respect to the vertical orientation of the mast assembly in FIG. 1. The tubes range from the largest outer diameter tube 12a to the smallest outer diameter tube 22a. Axially adjacent ones of the mast sections include interengaging guide and stop components on the mast tubes and which are structurally and functionally identical and vary only in diametrical dimensions which are dictated by the diameter of the corresponding mast tube. The guide and stop elements can be a latch and latch receiving assembly as shown and described in commonly owned U.S. Pat. Nos. 5,593,129 and 5,163,650. Other guide and stop elements could also be used with the mast as well.

In accordance with one aspect of the present exemplary embodiment, each of the tubes has a body having an inner diameter and an outer diameter and is preferably formed of durable carbon fiber composite tubes. One of the tubes is telescopically received by another tube where the inner diameter of a tube is slightly greater than the outer diameter of the tube that is positioned within the first tube, as can be clearly seen in FIG. 2.

Figure 3:
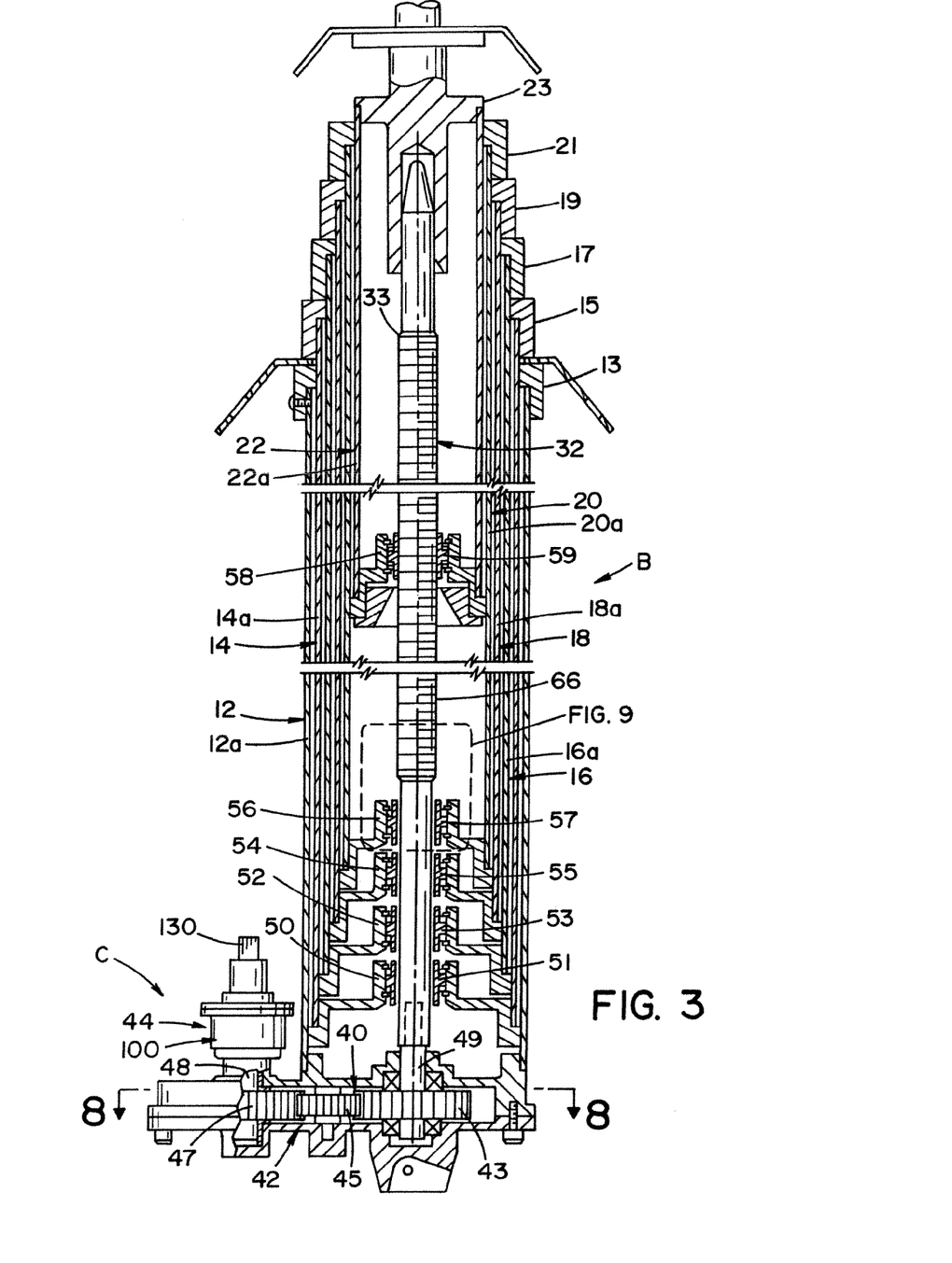
FIG. 3 is a side elevational view in cross-section of the telescoping mast assembly of FIG. 1 in a fully retracted position.
Figure 4:
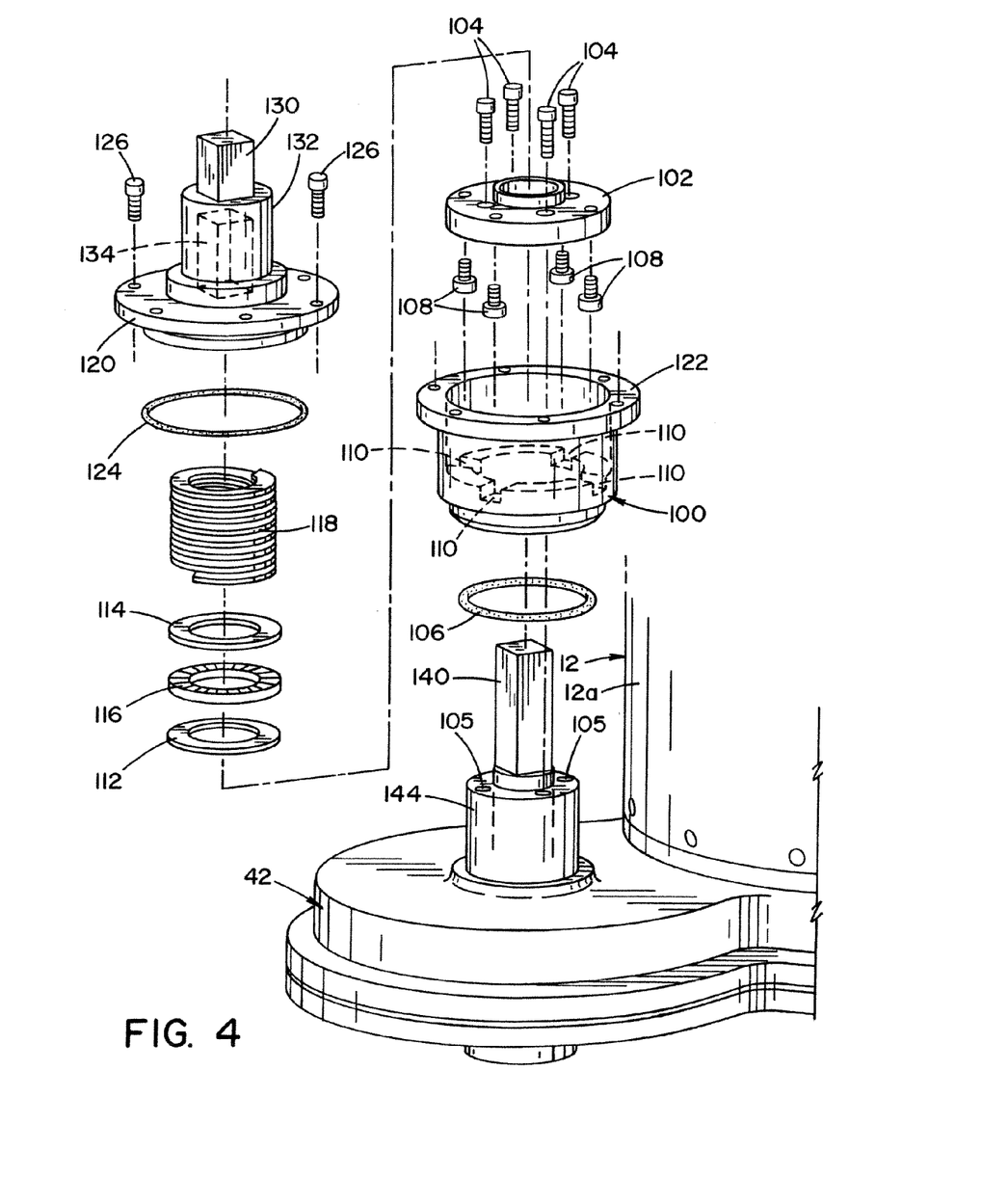
FIG. 4 is an exploded view of a locking mechanism of a gearbox assembly for the mast assembly of FIG. 1.

FIG. 2 depicts one embodiment comprising a telescoping mast assembly 10, having a plurality of nested mast sections 12-22 which have tubular sections 12a, 14a, 16a, 18a, 20a, and 22a, and are shown in the fully extended position. Referring to FIG. 3, the mast sections are retracted by means of a drive screw 32, which is rotated by means of a gear train 40 enclosed within a gear box 42, powered manually by a hand crank attached to a gear box locking mechanism 44. Nut carrier assemblies 50, 52, 54, 56, and 58 described more particularly below are carried on the lower ends of each of the nested intermediate mast sections, but are omitted from the lower end of the bottom mast section 12.

Referring again to FIG. 2, the mast assembly 10 and screw-drive components are mounted on a suitable base surface 34. The entire assembly may be maintained in vertical position by suitable cable guys 35, 36 or by other appropriate bracing.

Referring again to FIG. 3, each of the inner mast sections 14a-22a is provided with nut carriers 50, 52, 54, 56 and 58, respectively, which have drive-nut assemblies 51, 53, 55, 57, and 59, respectively, fixed in the lower portion of each mast section.

Figure 9:
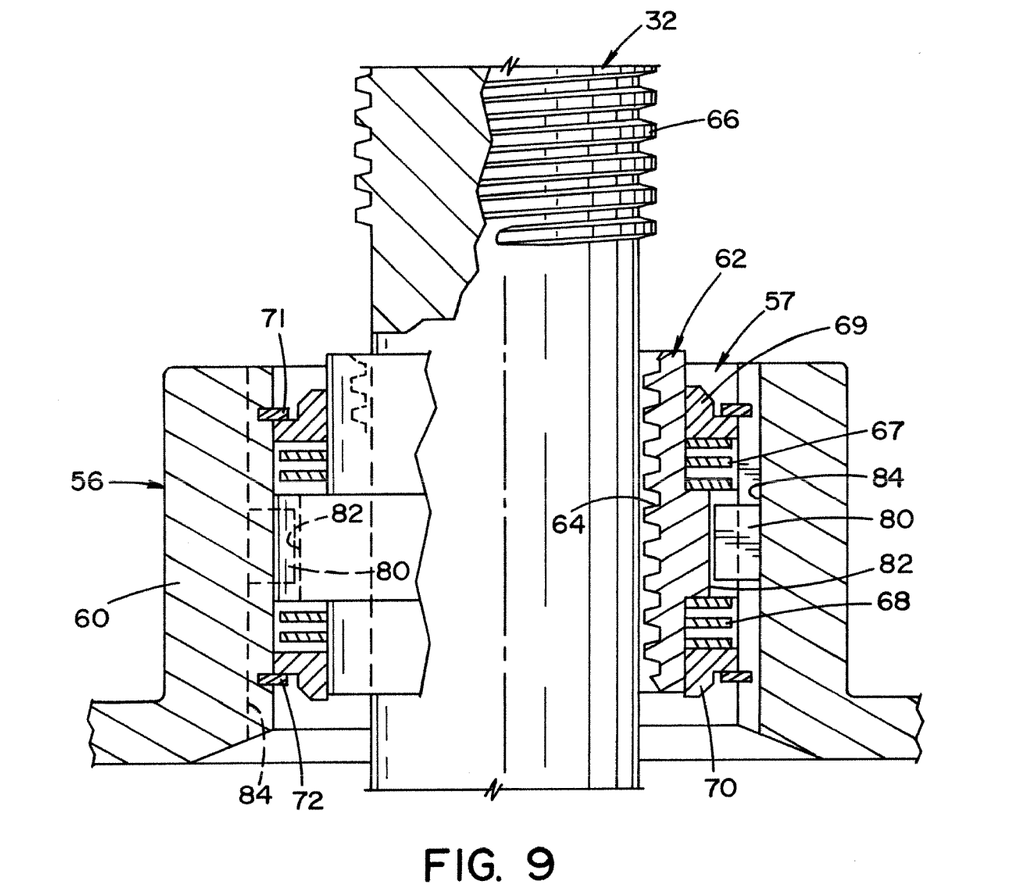
FIG. 9 is a side elevational view in cross section of a nut carrier assembly of FIG. 1; and, FIG. 10 is an exploded view of the nut carrier assembly of FIG. 1.
Figure 10:
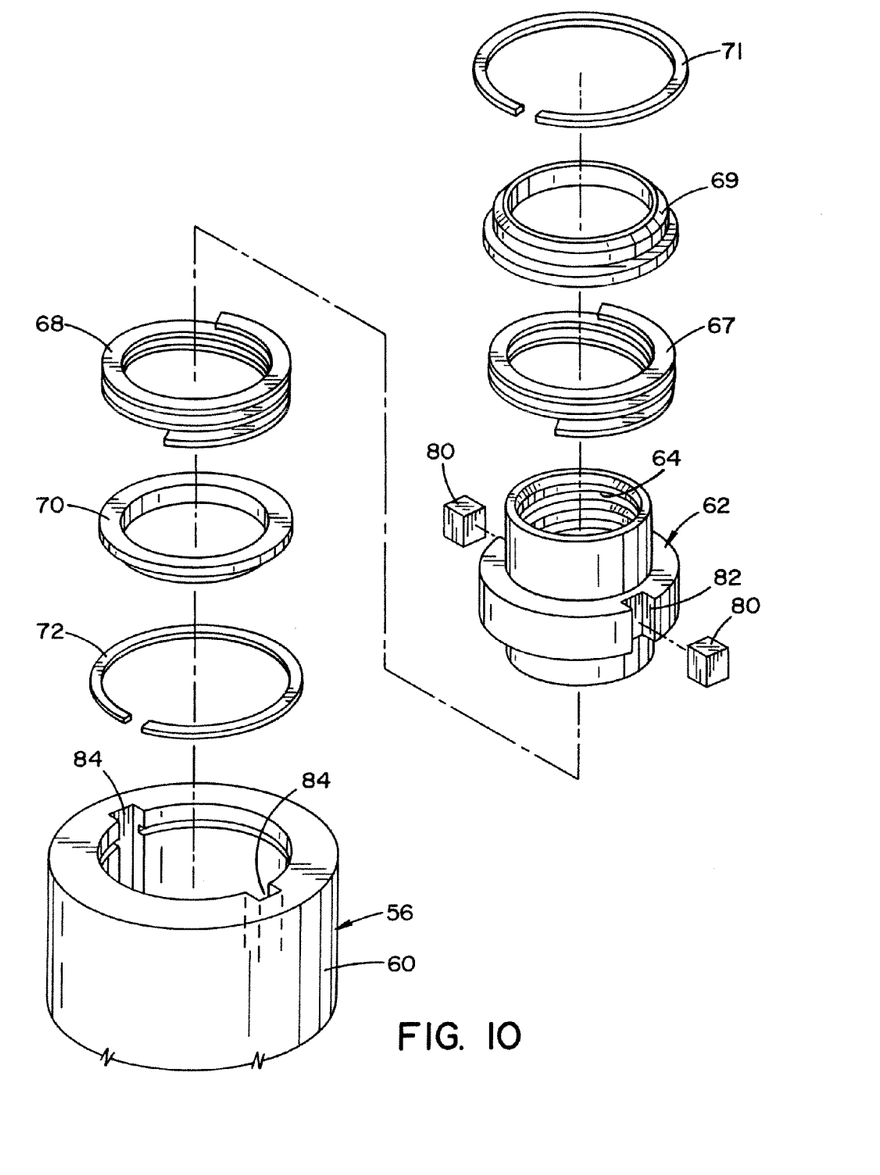

Referring to FIGS. 9 and 10, the details of one of the nut assemblies is shown. A nut carrier 60 of nut carrier assembly 56 receives a nut assembly 57 including a nut 62, the internal threads 64 of which are shaped and dimensioned to engage external threads 66 formed on the upwardly extending drive screw. The nut 62 is suspended in the housing by springs 67, 68, which are supported within the housing by retaining washers 69, 70. Snap rings 71, 72 secure the retaining washers in place. Projections or keys 80 extending from grooves 82 in nut wall fit into and are received by mating grooves or slots 84 in the housing 60. The keys restrain rotation of the nut relative to the nut carrier while permitting limited axial movement of the nut relative to the housing against the force exerted by the springs. This limited axial movement permits the springs to absorb axial loads which are temporarily imposed due to any initial mismatch between the internal threads of the nut and the exterior threads of the drive screw when the mast section is initially raised causing engagement of these threads or lowered onto the threads during retraction.

The preferred embodiment of the invention is depicted in FIG. 3 for purposes of illustration as a mast assembly including five nested cylindrical sections, formed, for example, of extruded 6061-T6 aluminum, a drive assembly is provided at the base of the mast assembly to transmit torque to the drive screw that extends upwardly to a point slightly above the top of bottom section. The drive screw engages the nuts 59, 57, 55, 53, 51 located at the bottoms of the mast sections 22a, 20a, 18a, 16a, 14a, sequentially, as each succeeding section is raised or lowered. When each of the sections reaches full extension, it is locked into engagement with an adjacent tubular section by a latching plate and a latch body assembly (not shown). At the same time, in the manner depicted in the embodiment of FIGS. 1-3, the drive screw engages the drive nut of the next lower section. This procedure. continues until all sections are fully extended. The drive nuts may be used with either a motor driven or manually cranked gear box assembly.

When the mast initially starts to be erected only the nut 59 on the central tube 22a is engaged in the threaded portion of the screw. As the screw rotates the center tube is lifted and extends upwardly. As the nut on the center tube moves vertically along the threaded portion of the screw latch plates (not shown) on opposite sides of the center tube engage with latch bodies (not shown) adjacent tube 20a, locking and securing the central tube 22a and tube 20a together. The central tube nut 59 then pulls tube 22a up until the nut 57 on the tube 20a engages the threads on the screw. The screw then simultaneously drives both nuts 59, 57 until the nut 59 on the center tube comes off the end 33 of the screw. The load is then transferred from the center tube nut 59 to the tube nut 57. The process is repeated from one tube section to the next until the mast is fully extended as shown in FIG. 2. During retraction of the mast, the process is reversed and a trigger post is provided to uncouple the latch plates and the latch body assemblies.

Figure 6:
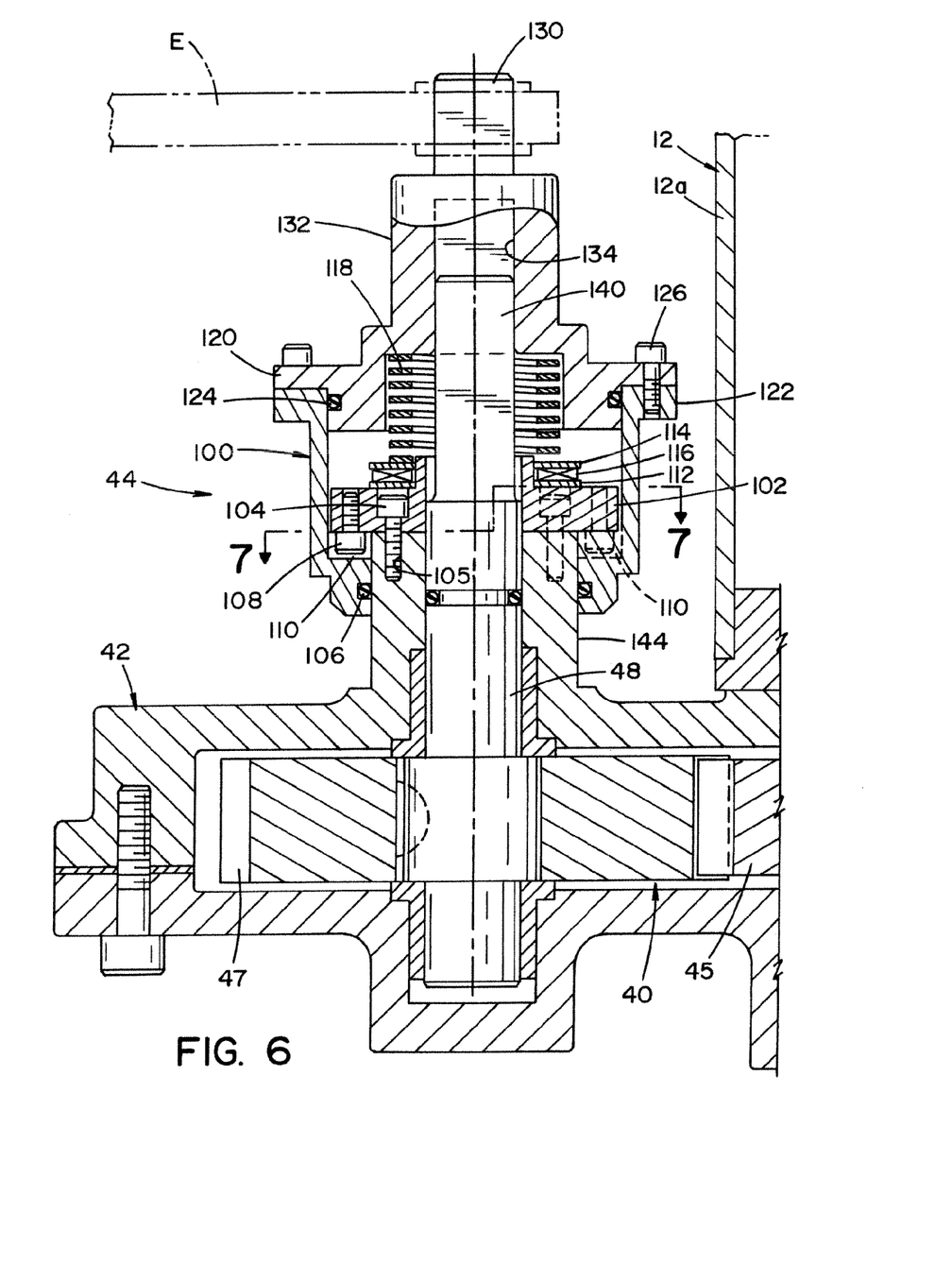
FIG. 6 is a side elevational view in cross section of the locking assembly in an engaged or locked position.

Referring now to FIG. 6, to perform the function of locking the mast sections in an extended or retracted position and prevent premature extension or retraction of the sections, a gearbox locking device is used. To lock the gearbox locking mechanism, the key 130 is released by removing the input device, such as a manual crank E, thus allowing the spring 118 to expand and raise the cover and cylinder until the heads of socket screws 108 engage the slots 110 in the cylinder, thus preventing the key, and the connected gears from rotating. Thus, the mast will be locked into position.

Figure 8:
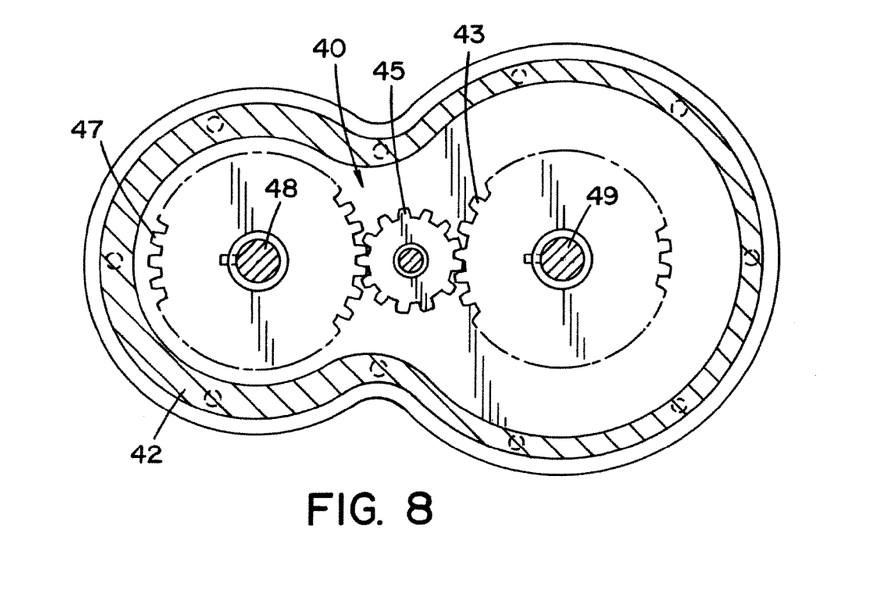
FIG. 8 is a top sectional view of the gearbox assembly taken along line 8-8 of FIG. 3.

Referring now to FIG. 8, the gearbox mechanism used to drive the drive screw includes a gearbox housing 42 which houses first, second and third gears 43, 45, 47. These gears are each preferably spur gears, although other types of gears can be used without departing from the scope of the invention. One of the gears 47 is attached to an input shaft 48, and another gear 43 is attached to an output shaft 49.

Referring now to FIGS. 4-7, positioned above the input shaft is a gear drive lock mechanism in accordance with a preferred embodiment of the present invention. The lock includes an outer lock cylinder 100 and a lock plate 102 having a plurality of socket head screws 104 securing the plate to openings 105 in column 144 of the gear box housing 42. The lock cylinder is positioned on the gear housing upper surface and an O-ring 106 is interposed between the upper surface and the lock cylinder. A second set of socket head screws 108 engage slots 110 in the cylinder when the plate is pressed into engagement with the cylinder. A pair of washers 112,114 surround a bearing 116 positioned adjacent a wave spring 118. A cover plate 120 is positioned over the spring and is installed onto rim 122 of the cylinder 100. An O-ring 124 is interposed between the cover plate and the rim. Socket head screws 126 secure the cover plate to the cylinder rim. The cover is pushed down to disengage the locking mechanism. The socket head screw heads 108 enter the slots 110 and prevent the drive from rotating.

Figure 5:
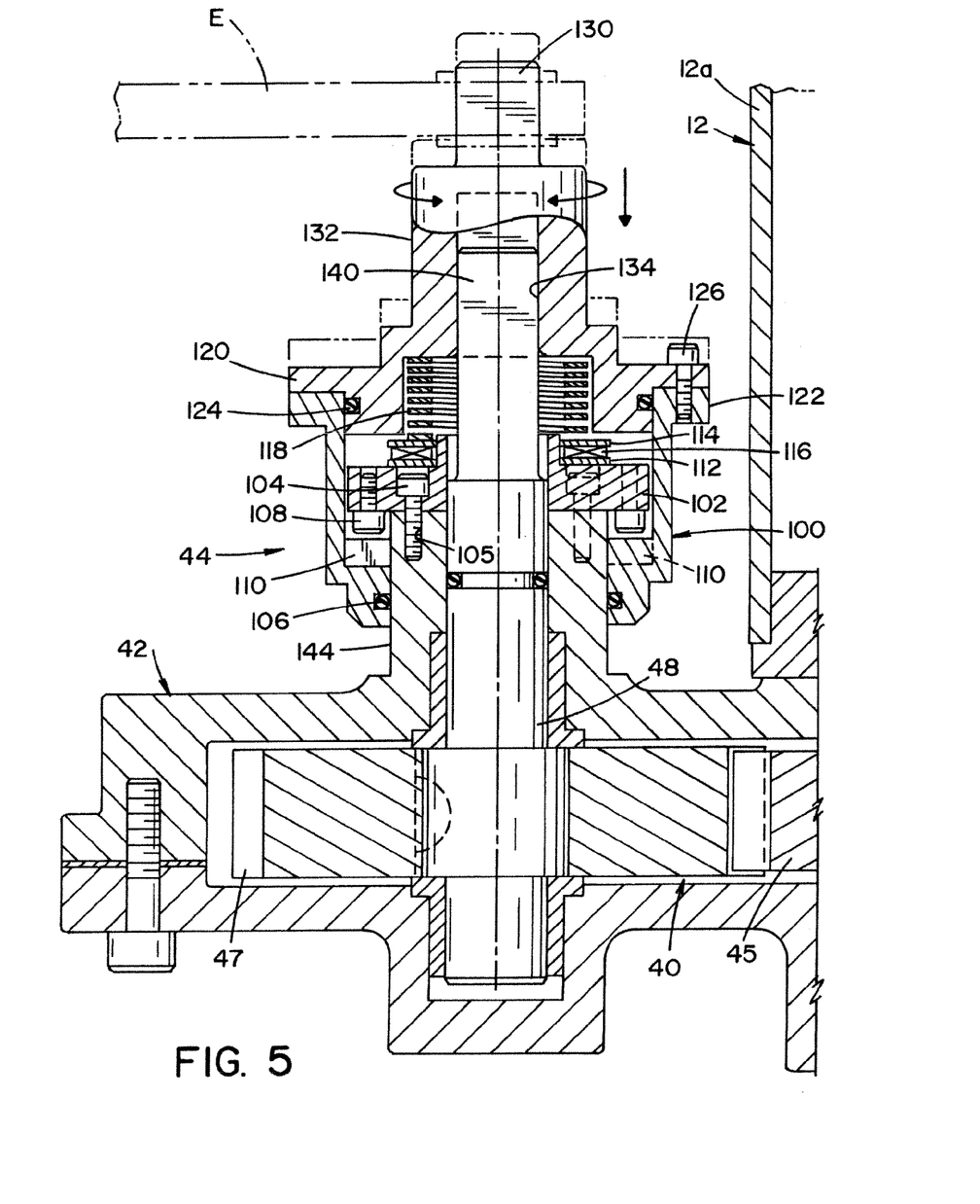
FIG. 5 is a side elevational view in cross section of the locking assembly in a disengaged position.
Figure 7:
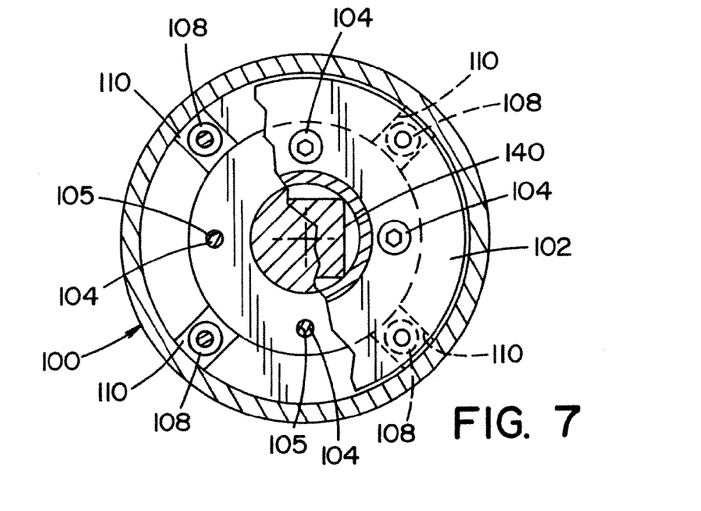
FIG. 7 is a top sectional view of the locking assembly taken along line 7-7 of FIG. 5.

When a manual crank is used to push down on the key 130, the cover plate and cylinder assembly is moved downwardly and the spring 118 is compressed. Referring now to FIGS. 5, 6, 7, pushing down on the cover compresses the spring which disengages the screw heads 108 from the plate, allowing the whole mechanism to rotate and drive the gear box. A key 130 extends from an upper member 132 of the cover plate. A recess 134 is formed within the upper member and engages a mating key 140 extending from column 144 of the gear box housing. The socket screw heads 108 are disengaged from the slots 110 in the cylinder, allowing the key 140 and the connected gears to rotate, thus allowing the mast section to be extended or retracted as necessary.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A telescoping mast assembly, comprising:
   at least three elongate tubular sections, wherein a first, a second, and a third elongate tubular section each has an upper end and a lower end; wherein said second elongate tubular section is telescopically received by said first elongate tubular section; said third elongate tubular section is telescopically received by said second elongate tubular section;
   an axial drive screw centrally located in said mast assembly for extending and retracting said second and third elongate tubular sections; and,
   a nut carrier assembly secured to a bottom section of each of said second and third tubular sections, said nut carrier assemblies each comprises a threaded nut housed within a collar, said threaded nut engages corresponding threads on said drive screw; and
   a gear assembly for rotating said drive screw, said gear assembly housed within a gearbox housing;
   a braking mechanism comprising a locking cylinder and a locking plate mounted to said gearbox housing; and
   a cover plate mounted to said locking cylinder.

2. The mast assembly of claim 1, wherein each of said nut carrier assemblies further comprises a pair of springs on opposite sides of said threaded nut housed within said collar.

3. The mast assembly of claim 2, wherein each of said nut carrier assemblies comprises keys on opposite sides of said threaded nuts.

4. The mast assembly of claim 3, wherein each of said nut carrier assemblies further comprises slots on opposite ends of an inner diameter of each of said collars.

5. The mast assembly of claim 4, wherein each of said nut carrier assemblies further comprises a pair of retaining washers to secure said pair of springs in position.

6. The telescoping mast assembly of claim 1, wherein said drive screw is an elongate member with threads.

7. The telescoping mast assembly of claim 1, wherein said gear assembly is manually controlled by a crank.

8. The telescoping mast assembly of claim 1, wherein said gear assembly is driven by a motor.

9. The telescoping mast assembly of claim 1, wherein said first, second and third elongate tubular sections each comprises carbon fiber material.

10. The telescoping mast assembly of claim 1, wherein said first, second and third elongate tubular sections are concentric with each other.

11. The telescoping mast assembly of claim 1, wherein said gear assembly comprises a first gear, a second gear and a third gear which have interengaging teeth.

12. The mast assembly of claim 11, wherein said gear assembly further comprises a shaft extending through said first gear for rotating said gear assembly.

13. The mast assembly of claim 1, wherein said locking plate comprises a plurality of retaining members.

14. The mast assembly of claim 13, wherein said locking cylinder comprises a plurality of slots for receiving said retaining members.

15. The mast assembly of claim 14, wherein said braking mechanism further comprises a spring interposed between said locking plate and said locking cylinder.

16. The mast assembly of claim 15, wherein said cover plate is secured to said locking cylinder via fastening members.

17. The mast assembly of claim 16, further comprising a key extending from said gear box housing.

18. The mast assembly of claim 17, wherein said cover plate comprises a recess for selectively receiving said key of said gear box housing.

19. The mast assembly of claim 18, wherein said cover plate comprises a key extending from a top surface thereof.

20. The mast assembly of claim 19, wherein when said cover plate is pushed in a downward manner, said spring compresses and said retaining members are released from engagement with said slots, allowing said shaft of said gear assembly to rotate.

21. The mast assembly of claim 20, wherein when said cover plate is released from being pushed in a downward manner, said spring expands and said retaining members engage said slots, thus restricting said shaft of said gear assembly from rotating.

22. A telescoping mast, comprising:
a plurality of elongate tubular sections which are telescopically attached to each other;
an axial drive screw centrally located in said mast for extending and retracting said elongate tubular sections;
a gear assembly connected to said drive screw for rotating said drive screw; and
a locking mechanism for locking said gear assembly, said locking mechanism comprises a first section surrounding a second section secured to said gear assembly, wherein said second section comprises at least one elongated member extending from a surface of said second section; and
wherein said first section comprises at least one slot for engaging said at least one elongated member, thereby preventing rotation of said gear assembly,
wherein said locking mechanism first section comprises a cylinder;
wherein said locking mechanism second section comprises a disk; and
a cover member secured to an upper surface of said cylinder.

23. The telescoping mast of claim 22, wherein said disk is secured to said gear assembly.

24. The telescoping mast of claim 22, wherein said at least one elongated member comprises a plurality of fasteners spaced apart on said disk.

25. The telescoping mast at claim 22, wherein said cylinder comprises a plurality of slots spaced apart on an internal surface of said cylinder.

26. The telescoping mast of claim 22, further comprising a biasing member interposed between said disk and said cover member.

27. The telescoping mast of claim 26, wherein said biasing member comprises a spring.

28. The telescoping mast of claim 27, wherein said spring is received within a recess of said cover member.

29. The telescoping mast of claim 27, wherein when said spring is in an extended position, said at least one elongated member on said disk is in mating engagement with said at least one slot of said cylinder, thus preventing rotation of said input shaft.

30. The telescoping mast of claim 29, wherein when said spring is in a compressed configuration, said at least one elongated member is released from engagement from said at least one slot, thus allowing rotation of said input shaft.

31. The telescoping mast of claim 30, wherein said cover member further comprises an extension member which matingly engages an associated handle for rotating said input shaft.

* * * * *